United States Patent [19]
Macken et al.

[11] Patent Number: 5,528,613
[45] Date of Patent: Jun. 18, 1996

[54] LASER APPARATUS UTILIZING A MAGNETICALLY ENHANCED ELECTRICAL DISCHARGE WITH TRANSVERSE AC STABILIZATION

[76] Inventors: John A. Macken, 3755 Wallace Rd., Santa Rosa, Calif. 95404; Nikolaj Yatsenko, Pugovishnikov per.4, kv.33. Moscow, Russian Federation, 119021

[21] Appl. No.: 400,551

[22] Filed: Mar. 8, 1995

Related U.S. Application Data

[63] Continuation of Ser. No. 46,024, Apr. 12, 1993, abandoned.

[51] Int. Cl.$^6$ .................................................. H01S 3/0975
[52] U.S. Cl. ................... 372/37; 372/38; 372/82; 372/83; 372/86; 372/87
[58] Field of Search ........................ 372/82, 83, 69, 372/87, 38, 37, 86, 29

[56] References Cited

U.S. PATENT DOCUMENTS

| | | | |
|---|---|---|---|
| 4,596,018 | 6/1986 | Gurber et al. | 372/87 |
| 4,710,942 | 12/1987 | Howard | 372/88 X |
| 4,755,999 | 7/1988 | Macken | 372/37 |
| 4,930,135 | 5/1990 | Karube et al. | 372/38 X |
| 5,067,135 | 11/1991 | Perzl et al. | 372/87 X |
| 5,097,472 | 3/1992 | Chenausky | 372/86 X |

*Primary Examiner*—Rodney B. Bovernick
*Assistant Examiner*—Hemang Sanghavi
*Attorney, Agent, or Firm*—Larry D. Johnson

[57] ABSTRACT

This invention is an improvement on U.S. Pat. No. 4,755,999, titled, "Laser Apparatus Utilizing a Magnetically Enhanced Electrical Discharge." That patent describes a method of forming a thin, flat discharge (slab discharge) bounded by two facing surfaces where a magnetic field is oriented perpendicular to the surfaces. This invention teaches that it is possible to improve the stability of the slab discharge by adding an AC electric field perpendicular to the facing surfaces.

2 Claims, 3 Drawing Sheets

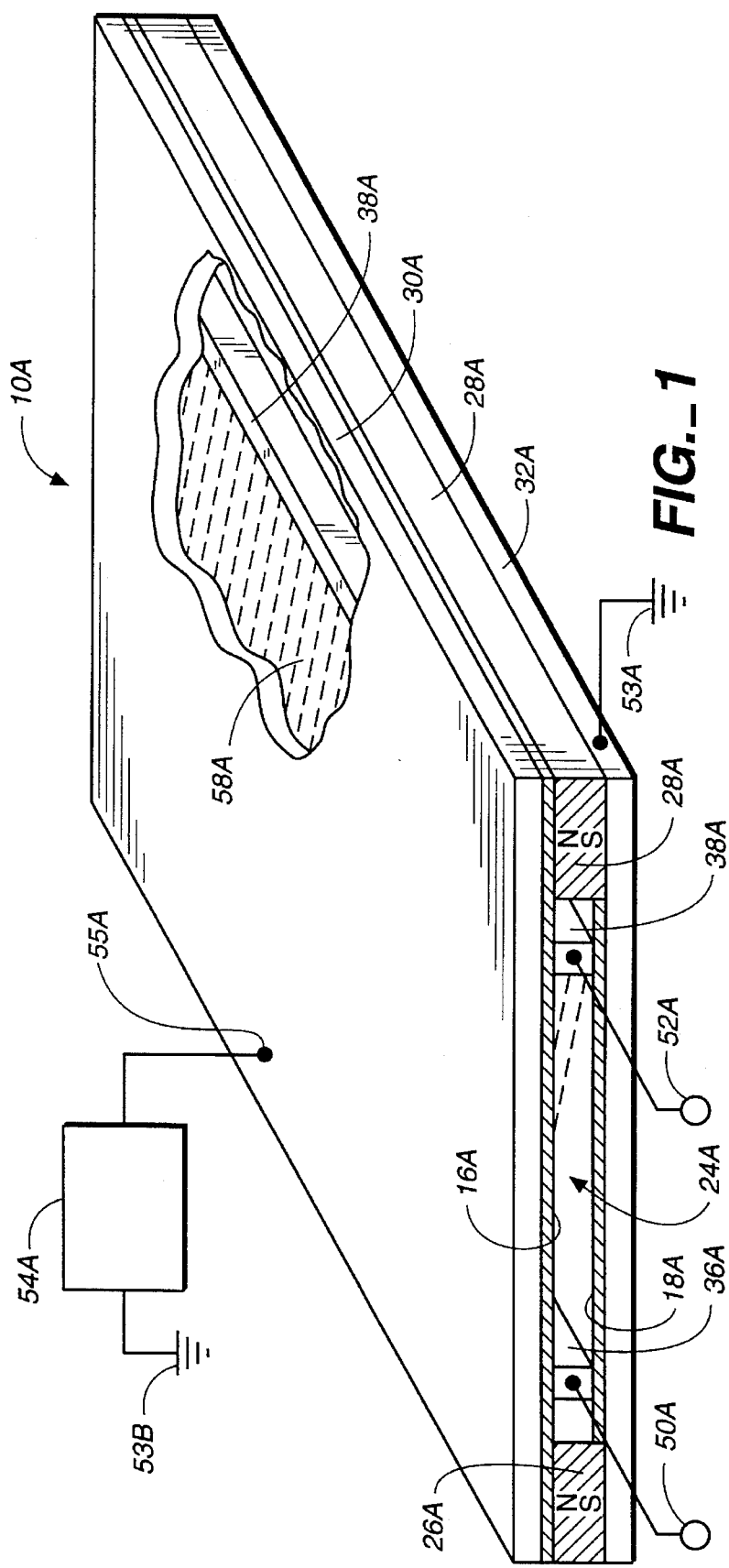
FIG._1

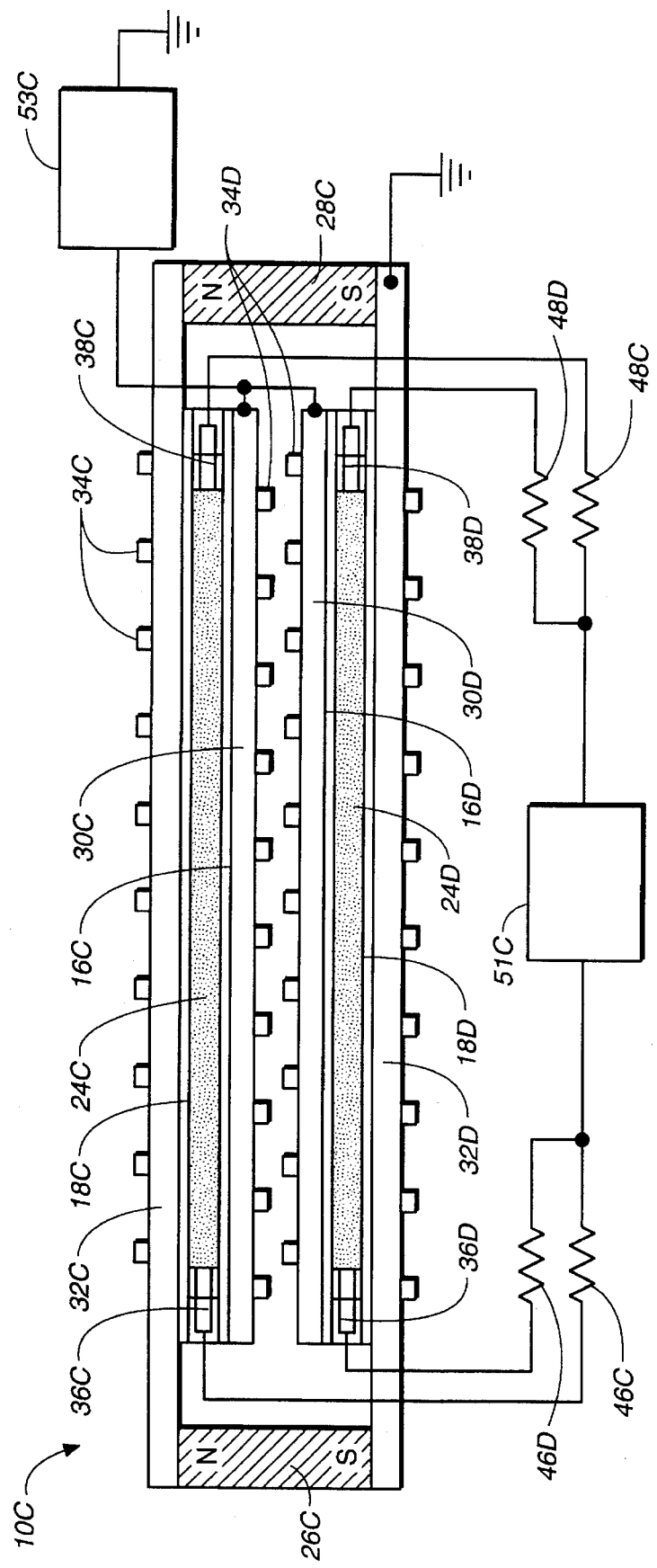
FIG._2

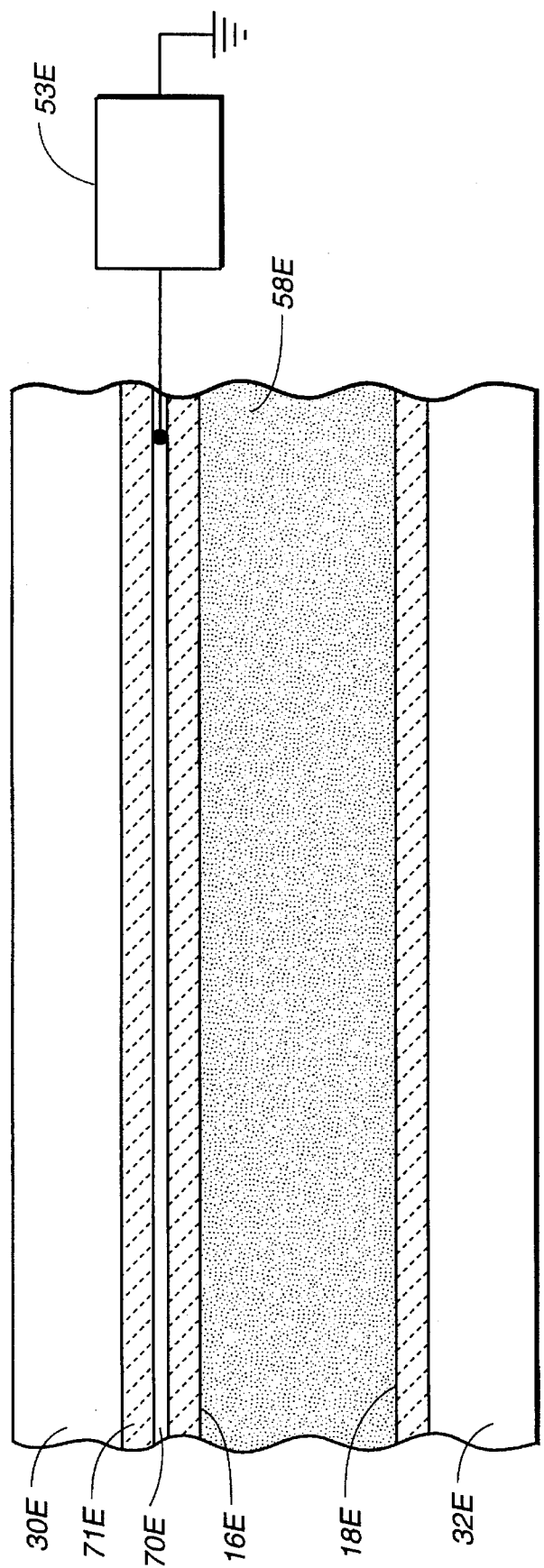
FIG._3

LASER APPARATUS UTILIZING A MAGNETICALLY ENHANCED ELECTRICAL DISCHARGE WITH TRANSVERSE AC STABILIZATION

This application is a continuation of application Ser. No. 08/046,024, filed Apr. 12, 1993 now abandoned.

BACKGROUND OF THE INVENTION

1. Field of the Invention

This invention relates to an apparatus for creating a gaseous discharge and more particularly, to gaseous discharge for use as a laser amplifier section.

2. Description of Prior Art

U.S. Pat. No. 4,755,999 titled, "Laser Apparatus Utilizing a Magnetically Enhanced Electrical Discharge" (July 1988, J. A. Macken) describes a laser amplification section of a laser apparatus in which a discharge is spread to form a thin sheet or an annular shape. Lasers with these discharge shapes, have subsequently become known as "slab lasers" and the discharge as a "slab discharge." The term "slab" is technically not grammatically correct but this common usage will be utilized here. In this laser apparatus, a gaseous filled cavity is bounded by a first and second opposing surfaces. These are closely spaced relative to the dimensions of the surfaces. Elongated electrodes within the cavity generate a discharge. Magnets generate a magnetic field within the cavity. This magnetic field is oriented generally perpendicular to the opposing surfaces. The discharge is relatively narrow in the dimension parallel to the magnetic field compared to the dimension perpendicular to both the magnetic field and the electric field. The magnetic field exerts a force on the discharge. When the magnetic field exceeds a threshold value, the discharge is homogeneous within the cavity. This homogeneous discharge condition is well suited for exciting gaseous lasers such as $CO_2$ lasers. Heat generated by this discharge is efficiently removed by thermal conduction to the two opposing surfaces. The surfaces, in turn, are liquid-cooled.

The discharge as described in this patent can have some disadvantages. First, it is sometimes necessary to use multiple electrodes. Each of these electrodes has some form of ballasting to help distribute the discharge. Second, the strength of the magnetic field must be above a threshold number which in thin cavities, can be high. Third, the discharge can take up to 0.1 seconds to become stable when the power is first applied to the electrodes. This time is too slow to permit modulation of the laser by modulating the discharge.

The invention described herein is an improvement whereby a small amount of AC electrical power applied perpendicular to the opposing surfaces can assist the magnetic field in stabilizing the discharge. This can reduce the threshold magnetic field required for stability. It also can decrease the need for multiple electrodes. Finally, the initiation of the discharge can occur more rapidly when the transverse AC field is present.

SUMMARY OF THE INVENTION

This invention is an improvement on the invention described in U.S. Pat. No. 4,755,999 (Jul. 1988, J. A. Macken) titled, "Laser Apparatus Utilizing a Magnetically Enhanced Electrical Discharge." In that invention, an apparatus and method is described for making the amplification section of a laser where a discharge is homogeneously distributed in a thin, broad area cavity. The cavity is bounded by two facing surfaces. A magnetic field is applied perpendicular to the facing surfaces. The discharge is formed parallel to the facing surfaces between two elongated electrodes in the cavity.

This invention teaches that it is possible to improve the stability of the broad area discharge by adding an AC electric field perpendicular to the facing surfaces. The primary power source is still provided by the power supply which drives the internal electrodes. The AC electric field can improve the modulation characteristics, reduce the magnetic field requirements, and simplify the electrode construction.

BRIEF DESCRIPTION OF THE DRAWINGS

FIG. 1 is the perspective view of a single layer laser amplification section utilizing a magnetically enhanced discharge with transverse AC stabilization.

FIG. 2 is a cross-sectional end view of a two layer slab discharge cavity using transverse AC stabilization.

FIG. 3 is an end view of a portion of a discharge cavity which utilizes two grounded metal plates and an internal AC excited metallic conductor.

DESCRIPTION OF PREFERRED EMBODIMENTS

This is an improvement on U.S. Pat. No. 4,755,999 titled, "Laser Apparatus Utilizing a Magnetically Enhanced Electrical Discharge" (July 1988, J. A. Macken). This patent contains relevant information and should be considered as part of this disclosure. For brevity, this patent will be referred to as "Magnetically Enhanced Discharge Patent." This patent gives two examples of sweeping discharges. In one example, discrete discharges move rapidly through a gas. This condition does not efficiently excite laser action. The homogeneous discharge (Macken Discharge) is the only condition where efficient laser excitation has been observed. The components of the discharge apparatus such as electrodes, ballasting, cavity shape, gas composition, gas pressure, and magnetic field all work together to achieve the homogeneous discharge. When there is a reduction in the optimum for one of these considerations, then the strength of the magnetic field must be increased to compensate.

The application of an AC field applied perpendicular to the surfaces forming the discharge cavity has a beneficial effect on stability and reduces the magnetic field requirement. However, the magnetic field cannot be completely eliminated as long as the primary source of discharge power comes from the elongated electrodes. This benefit can be utilized to simplify electrode construction and to increase the time required for initiation of the discharge. In one embodiment, the AC field can be a radio frequency field between 10 and 100 mega Hertz. A second embodiment can utilize a lower frequency AC field between 9 and 600 KHz. The AC field can either be applied in local regions of the discharge such as the "launcher end." or it is also possible to apply a low level AC field over the entire discharge. The objective is to have the primary power source applied through the elongated electrodes and utilize the transverse AC field for improved stability characteristics.

Referring now to FIG. 1, there is shown a perspective view of a laser amplification section. The numbers (but not the letter suffix) used in the figures herein are the same as analogous parts in the Magnetically Enhanced Discharge Patent. In FIG. 1, apparatus 10A has two steel plates (30A and 32A). These plates are magnetized by magnets 26A and 28A. In this figure, the North and South poles of the magnets are designated "N" and "S." This structure forms the magnetic equivalent of a parallel plate capacitor. The magnetic field (42A) is distributed by the steel plates and uniformly fills the cavity 24A between the plates. Elongated electrodes 36A and 38A extend along the edges of the cavity. These electrodes may be broken into multiple individual electrodes with individual ballasting. Cavity 24A is electrically insulated by dielectric plates 16A and 18A. This figure depicts only the portion a laser which relates to the discharge apparatus. There is an envelope (not shown) which maintains a partial vacuum. Also, laser mirrors (not shown) form the optical resonator required for laser action. Electrode 36A is connected to a power supply (not shown) utilizing electrical terminal 50A. Also, electrode 38A is connected to the power supply by terminal 52A. A laser gas mixture fills the cavity such that a discharge (38A) can be formed in the cavity when power is applied to the electrodes. The magnetic field strength and the electrode shapes are optimized to maintain a stable discharge. The new feature described herein is that plate 30A is electrically isolated from plate 32A by the dielectric material 16A. In this example, plate 32A is connected to ground (53A). Plate 30A is connected to an AC power supply 54A. The other side of the AC power supply in this example is grounded (53B).

In this example, the entire plate 30A is shown as being connected to the AC power supply 54A. However, it should be understood that it is also possible to divide plate 30A into two or more electrically insulated sections and apply transverse AC power to only a portion of the discharge cavity.

When the AC voltage is applied to plate 30A, this power can be capacitively coupled through dielectric sheets 16A and 18A to reach grounded plate 32A. The portion of the power which traverses the discharge cavity can form a broad area discharge even when there is no power applied to electrodes 36A and 38A. To achieve this, the AC voltage must be sufficiently high. When an RF frequency is used such that a discharge is formed which has a space charge near each dielectric surface (called an alpha type discharge), the ionization is highest in the middle of the cavity. This usually falls within a frequency range of 10 MHz to 200 MHz. This type of discharge has characteristics which can excite $CO_2$ laser gas mixtures to produce laser action. The major benefit of combining the transverse RF excitation with the primary discharge is that the RF excitation is expensive and can produce nonuniformities when used alone. The primary excitation can be DC which is inexpensive and can be spread over a large area.

A second condition exists when the AC excitation is in the range of 9 to 600 KHz. At this lower frequency, the discharge produced without any excitation from the internal electrodes would be an ionization near the two dielectric surfaces 16A and 18A. This condition would not normally produce the proper excitation for a $CO_2$ laser. However, when combined with the primary excitation from the internal electrodes, the discharge can properly excite the $CO_2$ laser gas mixture.

FIG. 2 is a cross-sectional view of a laser amplification section consisting of two cavities. The numbers in this figure correspond to analogous parts in FIG. 1. Therefore, the grounded plates are 32D and 32C. The plates driven with an AC power, are 30C and 30D. The dielectric surfaces are 16C and 16D in the upper cavity, and 18C and 18D in the lower cavity. Electrodes are 36C, 38C, 36D, and 38D. The cavities themselves are 24C and 24D. In this design, magnets 26C and 28C magnetize only the two outer plates 32C and 32D.

The magnetic field is distributed throughout the structure such that both cavities have a uniform magnetic field. Cooling tubes 34C are attached to the plates 32C, 32D, 30C, and 30D. These tubes carry a coolant such as water to remove the heat generated in the discharge. In FIG. 1, no source of cooling was illustrated for simplicity, but it is to be understood that in the preferred embodiment, there is always some heat removal mechanism such as tubes 34C and 34D. FIG. 2 illustrates the use of some form of ballasting such as resistors 48C, 48D, 46C, 46D connected to the respective electrodes 38C, 38D, 36C, and 36D. Other forms of ballasting as discussed in the Magnetically Enhanced Discharge Patent could also be used. The electrical power supply for the electrodes 36C, 36D, 38C and 38D (the primary power) is represented by box 51C. In the preferred embodiment, this is a DC power supply but it could be an AC power supply.

In FIG. 2, plates 38C and 38D are driven by AC power supply 53C. This configuration has the advantages that any electrical noise generated by driving the large area plates can be effectively contained within the grounded structure.

FIG. 3 is a close-up cross-sectioned view of a discharge cavity which illustrates an alternative to driving the entire cavity plate. In FIG. 3, 30E and 32E are the metal cavity plates 16E and 18E are the dielectric plates and 58E is the discharge. The new feature illustrated in FIG. 3 is that 70E is an electrical conductor and 71E is a dielectric. AC power supply 53E is connected to conductor 70E rather than being connected to plate 30E as was illustrated in FIGS. 1 and 2. Applying AC power in this way will cause the ionization in the discharge cavity as previously described, but there will also be a portion of the AC current which is capacitively coupled through dielectric plate 71E to grounded plate 30E. This current is not an actual power loss because of a phase shift between current and voltage. The design illustrated in FIG. 3 is particularly suited when only a portion of the discharge cavity is to receive the AC transverse excitation.

The examples given herein are for flat cavities. However, it is to be understood that other cavity shapes are possible using the teachings presented herein. For example, in the Magnetically Enhanced Discharge Patent, illustrations are given for cylindrical geometry and descriptions are given for other geometries. These geometrical variations are included herein.

While there have been shown and described preferred embodiments, it is to be understood that various other adaptations and modifications may be made within the spirit and scope of the invention.

We claim:

1. An apparatus for producing a generally uniform slab discharge in a gas contained in a cavity primarily bounded by a first and second dielectric surfaces, said discharge is primarily formed between first and second electrodes connected to a first electrical DC power supply for providing a DC field, also a magnetic field is oriented generally perpendicular to said dielectric surfaces, the improvement comprising:

at least a portion of said first and second dielectric surfaces are backed by first and second electrical conductors;

a second electrical power supply producing AC power at frequency F is connected to said first and second electrical conductors such that at least a portion of said AC power is capacitively coupled through said first and second dielectric surfaces to provide an AC field perpendicular to said DC fields and interact with said slab discharge to improve the stability of said slab discharge.

2. The apparatus according to claim 1 where said cavity is adjacent to a second cavity bounded by third and fourth dielectric surfaces, said third and fourth dielectric surfaces are backed by third and fourth electrical conductors, said second and third conductors are driven by said AC power and said first and fourth electrical conductors are electrically grounded such that electrical noise emission from said AC power is minimized.

* * * * *